US011221935B2

(12) United States Patent
Satoyama et al.

(10) Patent No.: US 11,221,935 B2
(45) Date of Patent: Jan. 11, 2022

(54) INFORMATION PROCESSING SYSTEM, INFORMATION PROCESSING SYSTEM MANAGEMENT METHOD, AND PROGRAM THEREOF

(71) Applicant: HITACHI, LTD., Tokyo (JP)

(72) Inventors: Ai Satoyama, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 76 days.

(21) Appl. No.: 16/295,692

(22) Filed: Mar. 7, 2019

(65) Prior Publication Data

US 2020/0042416 A1 Feb. 6, 2020

(30) Foreign Application Priority Data

Jul. 31, 2018 (JP) .............................. JP2018-144411

(51) Int. Cl.
*G06F 11/30* (2006.01)
*G06F 11/20* (2006.01)
(Continued)

(52) U.S. Cl.
CPC ........ *G06F 11/3055* (2013.01); *G06F 3/0605* (2013.01); *G06F 3/067* (2013.01);
(Continued)

(58) Field of Classification Search
CPC .... G06F 11/008; G06F 11/20; G06F 11/2005; G06F 11/201; G06F 11/203;
(Continued)

(56) References Cited

U.S. PATENT DOCUMENTS

| | | |
|---|---|---|
| 5,754,756 A | 5/1998 | Watanabe et al. |
| 6,516,425 B1 | 2/2003 | Belhadj et al. |

(Continued)

FOREIGN PATENT DOCUMENTS

| | | |
|---|---|---|
| JP | 08-249132 A | 9/1996 |
| JP | 2001-147785 A | 5/2001 |

(Continued)

OTHER PUBLICATIONS

Japanese Office Action dated Sep. 1, 2020 for Japanese Patent Application No. 2018-144411.

*Primary Examiner* — Matthew M Kim
*Assistant Examiner* — Kurosu Risa Altaf
(74) *Attorney, Agent, or Firm* — Volpe Koenig

(57) ABSTRACT

An object of the present invention is to provide a redundant information processing system that can continue its operation without stopping as much as possible. To achieve this, the information processing system includes multiple storage nodes including processors, memories, and storage devices, as well as a network for connecting the storage nodes. The processor of at least one storage node performs the steps of: obtaining the configuration information of the information processing system; obtaining first failure information related to a first failure occurred in the information processing system; calculating the availability level of the information processing system when a second failure further occurs, based on the configuration information and the first failure information; and controlling the operation of the system based on the availability level. Then, the processor outputs a notification.

12 Claims, 14 Drawing Sheets

(51) Int. Cl.
*G06F 11/34* (2006.01)
*G06F 3/06* (2006.01)
*G06F 11/10* (2006.01)

(52) U.S. Cl.
CPC .......... *G06F 3/0617* (2013.01); *G06F 3/0635* (2013.01); *G06F 11/1092* (2013.01); *G06F 11/2028* (2013.01); *G06F 11/3006* (2013.01); *G06F 11/3433* (2013.01); *G06F 11/3452* (2013.01); *G06F 2201/81* (2013.01)

(58) Field of Classification Search
CPC ............. G06F 11/2033; G06F 11/2089; G06F 11/1666; G06F 11/1675; G06F 11/1092; G06F 11/3055; G06F 11/3006; G06F 11/3452; G06F 11/3433; G06F 11/2028; G06F 3/0617; G06F 3/0635; G06F 3/067; G06F 3/0605; G06F 2201/81
See application file for complete search history.

(56) References Cited

U.S. PATENT DOCUMENTS

| | | | | |
|---|---|---|---|---|
| 7,139,925 | B2* | 11/2006 | Dinker | H04L 41/12 714/4.3 |
| 7,539,907 | B1* | 5/2009 | Johnsen | G06F 11/008 714/26 |
| 8,645,750 | B2* | 2/2014 | Kaneko | G06F 11/07 714/6.2 |
| 8,880,801 | B1* | 11/2014 | Robins | G06F 11/1092 711/114 |
| 10,013,321 | B1* | 7/2018 | Stern | G06F 11/1076 |
| 2003/0009619 | A1 | 1/2003 | Kano et al. | |
| 2005/0114739 | A1* | 5/2005 | Gupta | G06F 11/3058 714/39 |
| 2005/0268147 | A1 | 12/2005 | Yamamoto et al. | |
| 2008/0059840 | A1* | 3/2008 | Takezawa | G05B 23/0248 714/37 |
| 2013/0317780 | A1* | 11/2013 | Agarwal | G05B 23/0248 702/181 |
| 2014/0336791 | A1* | 11/2014 | Asenjo | G06Q 10/06 700/44 |
| 2017/0132056 | A1* | 5/2017 | Epstein | H04L 41/145 |
| 2018/0227240 | A1* | 8/2018 | Liu | H04L 67/1029 |
| 2019/0370012 | A1* | 12/2019 | Sears | G06F 9/4411 |
| 2019/0377638 | A1* | 12/2019 | Ben Dayan | G06F 3/0644 |

FOREIGN PATENT DOCUMENTS

| | | |
|---|---|---|
| JP | 2003-015915 A | 1/2003 |
| JP | 2005-326935 A | 11/2005 |
| JP | 2010-277241 A | 12/2010 |

* cited by examiner

FIG. 5

| NODE ID | STATE | MAXIMUM CAPACITY | USE CAPACITY | CPU LOAD | MAXIMUM MEMORY AMOUNT | USED MEMORY AMOUNT | MAXIMUM COMMUNICATION BANDWIDTH | USED COMMUNICATION BANDWIDTH | FAILURE GROUP ID |
|---|---|---|---|---|---|---|---|---|---|
| 1 | NORMAL | 50TB | 10TB | 45% | 128GB | 55GB | 20Gbps | 5Gbps | 1 |
| 2 | ABNORMAL | 50TB | - | - | 128GB | - | 20Gbps | - | 2 |
| 3 | NORMAL | 50TB | 9TB | 80% | 128GB | 100GB | 20Gbps | 6Gbps | 3 |
| 4 | NORMAL | 50TB | 8TB | 40% | 128GB | 50GB | 20Gbps | 5Gbps | 3 |
| 24A | 24B | 24C | 24D | 24E | 24F | 24G | 24H | 24I | 24J |

| STATE | NUMBER OF INITIALLY ACTIVE STORAGE NODES [N] | NUMBER OF ACTIVE STORAGE NODES | NUMBER OF NORMAL STORAGE NODES | NUMBER OF FAILED STORAGE NODES |
|---|---|---|---|---|
| NORMAL | 4 | 4 | 4 | 0 |

FIG. 11

| FAILURE RATE | STORAGE CAPACITY OF ENTIRE SYSTEM | THROUGHPUT | REPLACE TIME |
|---|---|---|---|
| 1.0-E5 | 2PB | 100000 | 1h |
| 36A | 36B | 36C | 36D |

INFORMATION PROCESSING SYSTEM, INFORMATION PROCESSING SYSTEM MANAGEMENT METHOD, AND PROGRAM THEREOF

CLAIM OF PRIORITY

The present application claims priority from Japanese patent application JP 2018-144411 filed on Jul. 31, 2018, the content of which is hereby incorporated by reference into this application.

BACKGROUND

The present invention relates to an information processing system including multiple storage nodes in which SDS (Software Defined Storage) is implemented.

When a failure occurs, a conventional storage system with a single node configuration notifies the storage administrator of failure information indicating the occurrence of a failure. Upon receiving the notification, the storage administrator immediately gives an instruction to maintenance staff. Upon receiving the instruction, the maintenance staff starts maintenance work based on the failure information.

The maintenance work is performed each time a failure occurs. On the other hand, in the server cluster technology, the system repeats failover to continue system operation until the number of failed servers of all servers exceeds a threshold, and at the time when the number of failed servers exceeds the threshold, the operation of the entire system is temporarily stopped to perform maintenance work such as server replacement.

The information processing system such as SDS operates with a redundant configuration in which copies of data are stored in different server chassis in order to improve availability and reliability. Note that in the following description SDS means a storage device achieved by implementing software having a storage function in a general-purpose server device.

As a storage system using multiple multiple storage devices, for example, thin provisioning is known for managing physical devices as a virtual capacity pool (for example, Japanese Unexamined Patent Application Publication No. 2003-015915).

SUMMARY

In an SDS system configured with several thousand nodes, if a maintenance work is performed each time a failure occurs in one node within the SDS system, the frequency of maintenance works increases and the maintenance time relative to the operation time also increases, resulting in being unable to achieve realistic system operation.

Further, the SDS system operates with data redundantly stored within the SDS system, and it is possible to determine whether or not to continue the operation of the SDS system based on whether the redundant configuration is maintained. However, there has been a Problem that it is hard to determine whether the redundant configuration is maintained even by monitoring the number of failed nodes.

An object of the present invention is to provide a redundant information processing system that can continue its operation without stopping as much as possible.

The present invention is an information processing system including: multiple storage nodes including processors, memories, and storage devices; and a network for connecting the storage nodes. The processor of at least one storage node obtains the configuration information of the information processing system, and obtains first failure information related to a first failure occurred in the information processing system. Then, the processor calculates the availability level of the information processing system when a second failure further occurs, based on the configuration information and the first failure information, to control the operation of the system based on the availability level.

Thus, according to the present invention, it is possible to calculate the future availability level taking into account the redundancy of data, from the configuration of the information processing system as well as the failure information, and notify whether the information processing system requires immediate maintenance work. Based on the notification, it is possible to perform maintenance work by stopping the information processing system only when it is really required, or otherwise continue the I/O processing while avoiding stopping the information processing system as much as possible. With this configuration, it is possible to reduce the system operating expense (OPEX).

BRIEF DESCRIPTION OF THE DRAWINGS

FIG. 5 shows the first embodiment of the present invention, which is a diagram showing an example of the structure of a storage node management table;

FIG. 6 shows the first embodiment of the present invention, which is a diagram showing an example of the structure of a system state management table;

FIG. 11 shows the first embodiment of the present invention, which is a diagram showing an example of the structure of a parameter set value table;

DETAILED DESCRIPTION

Figure 1:
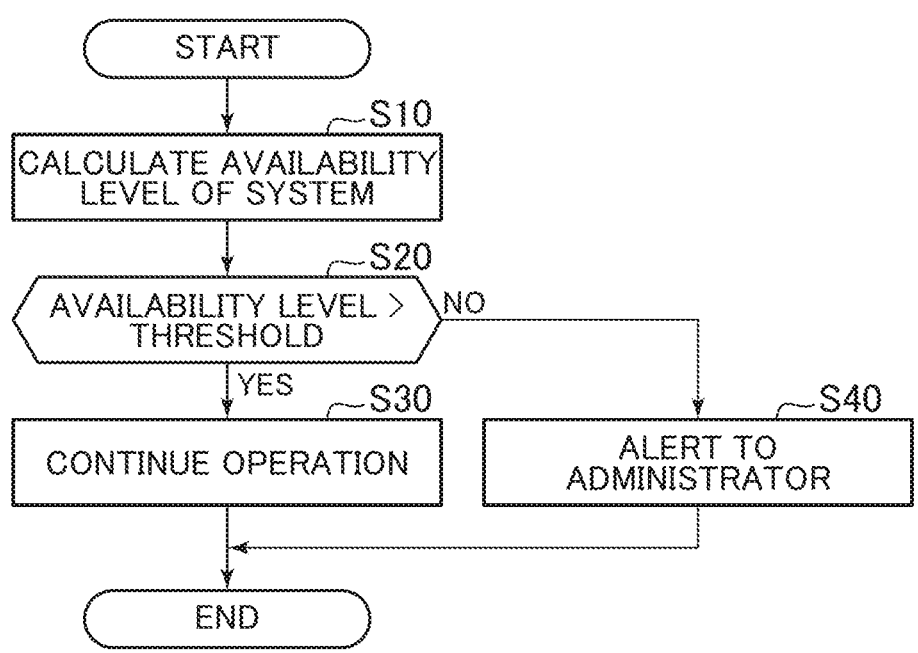
FIG. 1 shows a first embodiment of the present invention, which is a flowchart showing an overview of the present invention.

Hereinafter, preferred embodiments of the present invention will be described based on the accompanying drawings.

First Embodiment

A first embodiment of the present invention will be described in detail below with reference to the drawings. The following description and drawings are examples for illustrating the present invention, which are omitted and simplified as appropriate to make the description clear. Further, all combinations of the features described in the embodiments are not necessarily required for the solution of the invention.

The present invention is not limited to the embodiments and all applications consistent with the concept of the present invention are included in the technical scope of the present invention. Those skilled in the art can make various additions and modifications within the scope of the present invention. The present invention can also be implemented in various other embodiments. Unless otherwise specified, the number of units can be one or more in each component.

In the following description, various types of information may be described with expressions such as "table", "chart", "list", "queue", and the like. However, various types of information can also be expressed in other data structures. In order to show that the information is independent of data structure, "XX table", "XX list", and the like may be referred to as "XX information". When describing the content of each information item, expressions such as "identification information", "identifier", "name", "ID", and "number" are used. These expressions can be substituted for each other.

Further in the following description, when similar elements are described without distinction from one another, the reference symbol or a common number in the reference symbol is used. When similar elements are described distinctively from one another, the reference symbol of the element may be used, or the ID assigned to the element may be used instead of the reference symbol.

Further, in the following description, processes performed by executing a program may be described. In this case, the program is executed by at least one or more processors (for example, CPUs) to perform a predetermined process by appropriately using a storage resource (for example, memory) and/or an interface device (for example, communication port), and the like. Thus, the subject of the process can also be the processor.

Similarly, the subject of a process performed by executing a program can also be a controller with processor, a device, a system, a computer, a node, a storage system, a storage device, a server, a management computer, a client, or a host. The subject (for example, processor) of the process performed by executing the program can include a hardware circuit that performs part or all of the process. For example, the subject of the process performed by executing the program can include a hardware circuit that performs encryption and decryption, or compression and extension. The processor performs processing according to the program to operate as a functional part that achieves a predetermined function. Devices and systems including processors are devices and systems including such functional parts.

A program can be installed from a program source to a device such as a computer. For example, the program source can be a storage medium that can be read by program distribution servers or computers. When the program source is a program distribution server, the program distribution server includes processor (for example, CPU) and storage resource. The storage resource can also store a distribution program and a program to be distributed. Then, the processor of the program distribution server executes the distribution program. In this way, the processor of the program distribution server can distribute the program to be distributed to other computers. Further, in the following description, two or more programs can be achieved as one program, or one program can be achieved as two or more programs.

FIG. 1 shows a first embodiment of the present invention, which is a flowchart showing an overview of the present invention. A cluster control unit of a storage node calculates the "availability level" of an information processing system 1 (S10). The availability level is represented by the value obtained by calculating the probability that the system state will transit from a certain state to the state in which the information processing system stops after the next failure occurs.

The storage node compares the availability level with a predetermined threshold (S20). The storage node continues the operation of the system when the availability level is greater than the threshold (S30). When the availability level is equal to or less than the threshold, the storage node outputs a notification (alert) that requires maintenance work (S40). Note that the storage node can output the notification to a terminal (not shown) that the administrator uses.

When the storage node gives alert to the administrator, this means that the storage node requires some kind of maintenance work. When the availability level is above a certain level, namely, when it is determined that the availability of the system is high enough not to immediately cause a system stop, the storage node can decide that maintenance work is not required immediately after the failure occurrence.

It is not desirable to perform maintenance work as much as possible because it is necessary to temporarily stop the system to increase or decrease in number of storage nodes. The calculation method of the availability level will described below.

The flowchart of this process is started in a storage node at the time each event occurs or on a regular basis. An event is issued when a failure occurs in a storage node 3 or when there is a change in the state of the components within the information processing system, such as increase or decrease in number of storage nodes 3.

Note that the above shows an example of performing the process in the cluster control unit of the storage node. However, the present invention is not limited to this example, and the process can also be performed by the management computer.

<1. Configuration of the Information Processing System According to the First Embodiment>

Figure 2:
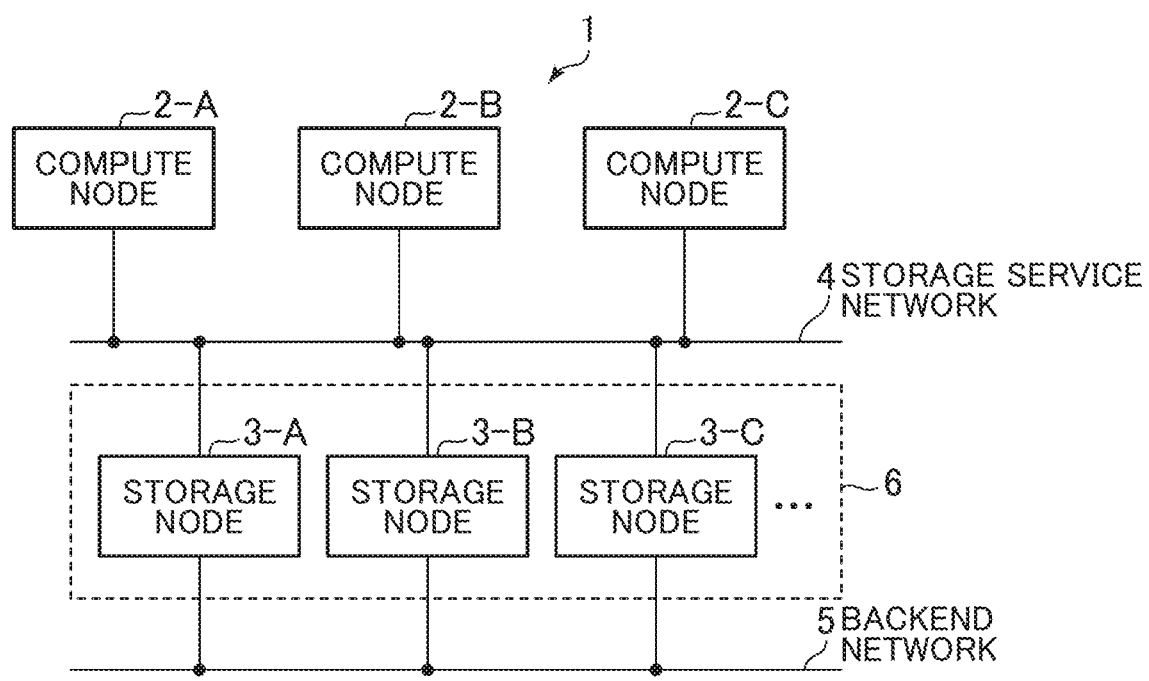
FIG. 2 shows first embodiment of the present invention, which is a block diagram showing the overall configuration of an information processing system.

FIG. 2 is a diagram showing the configuration of the information processing system 1 according to the present embodiment. The information processing system 1 includes compute nodes 2-A to 2-C and storage nodes 3-A to 3-C. Note that when the compute nodes 2-A to 2-C are not individually identified, the symbol "2" is used with "-" and subsequent symbols omitted. The same is applied to the symbols of other components.

Each compute node 2 and each storage node 3 are connected, for example, via fiber channel, Ethernet (registered trademark), InfiniBand or wireless LAN (Local Area Network), and the like.

The storage nodes 3 are connected to each other through a backend network 5 configured with LAN, Ethernet (registered trademark), InfiniBand or wireless LAN, and the like.

However, the storage service network 4 and the backend network 5 can be configured with the same network. Further, each of the compute nodes 2 and each of the storage nodes 3 can be connected to a management network other than the storage service network 4 and the backend network 5.

The compute node 2 is a general-purpose computer device that functions as a host (upper device) to the storage node 3. Note that the compute node 2 can be a virtual computer device such as a virtual machine. The compute node 2 reads and writes data from and to the storage node 3 through the storage service network 4 in response to user operation or a request from an implemented application program.

The storage node 3 is a server device that provides a storage area to the compute node 2 to read and write data. The storage node 3 can also be a virtual machine. Further, the storage node 3 can be configured to reside in the same physical node as the compute node 2.

In the case of the present embodiment, each storage node 3 is managed in a group called a cluster 6, together with one or other storage nodes 3 as shown in FIG. 2. The example of FIG. 2 shows the case of setting up only one cluster 6. However, multiple clusters 6 can also be provided within the information processing system 1. The cluster 6 can also be referred to as distributed storage system.

Figure 3:
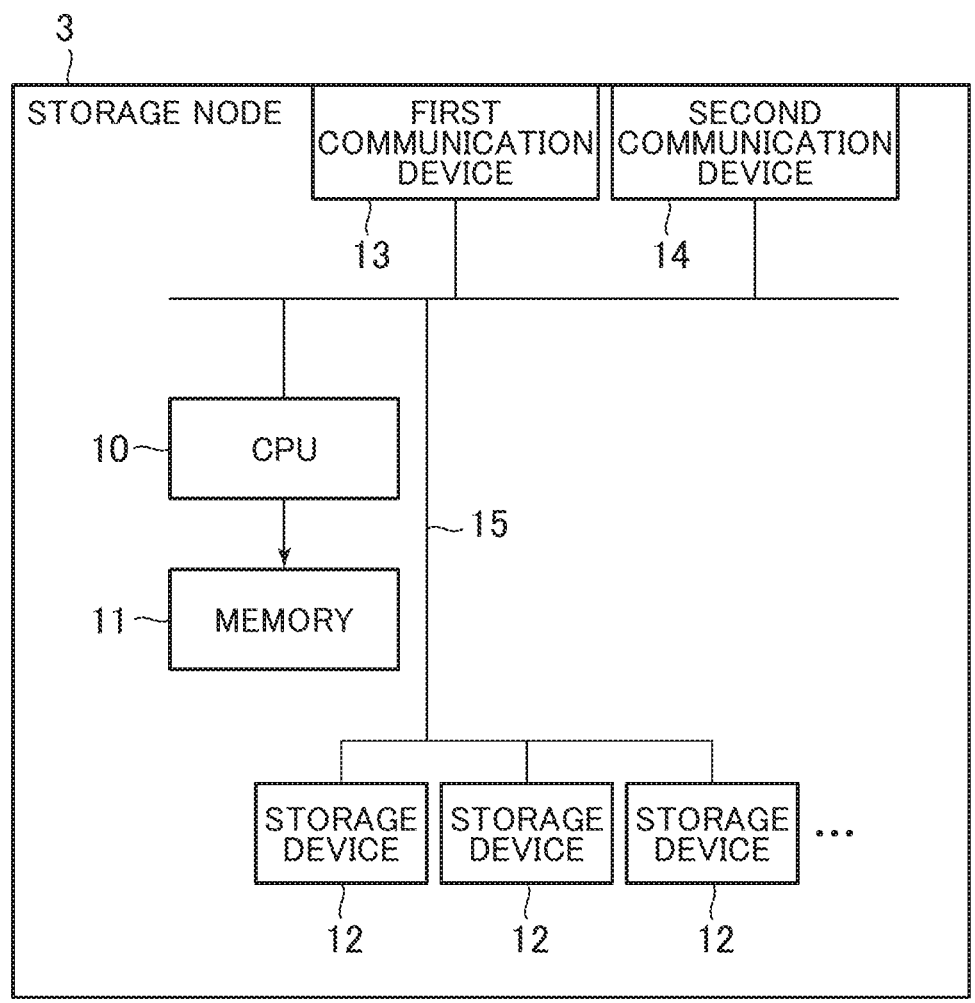
FIG. 3 shows the first embodiment of the present invention, which is a block diagram showing the overall configuration of a storage node.

FIG. 3 is a block diagram showing the overall configuration of the storage node. As shown in FIG. 3, the storage node 3 includes one or more CPUs (Central Processing Units) 10, one or more memories 11, multiple storage devices 12, and first and second communication devices 13 and 14. The storage node 3 is configured with a general-purpose physical server device in which the CPU 10, the storage devices 12, and the first and second communication devices 13, 14 are connected to each other through an internal network 15.

The CPU 10 is a processor for controlling the whole storage node 3. Further, the memory 11 is configured with volatile semiconductor memory such as SRAM (Static RAN (Random Access Memory) or DRAM (Dynamic RAM)), or with non-volatile semiconductor memory. The memory 11 is used as a work memory of the CPU 10 to temporarily store various programs and necessary data. The programs stored in the memory 11 are executed by at least one or more CPUs 10, and thus various processes of the whole storage node 3 are performed as described below.

The storage device 12 is configured with large capacity non-volatile storage device such as HDD (Hard Disk Drive), SSD (Solid State Drive), or SCM (Storage Class Memory). The storage device 12 is connected via an interface such as NVMe (Non-Volatile Memory Express) or SAS (Serial Attached SCSI (Small Computer system Interface)), SATA (Serial ATA (Advanced Technology Attachment)) to provide a storage area for reading and writing data in response to read and write requests from the compute node 2.

The first communication device 13 is the interface by which the storage node 3 communicates with the compute node 2 through the storage service network 4. For example, the first communication device 13 is configured with fiber channel card, Ethernet (registered trademark) card, InfiniBand card, wireless LAN card, and the like. The first communication device 13 controls protocols when communicating with the compute node 2.

The second communication device 14 is the interface by which the storage node 3 communicates with other storage nodes 3 through the backend network 5. For example, the second communication device 14 is configured with fiber channel card, Ethernet (registered trademark) card, InfiniBand card, wireless LAN card, PCIe host adopter, and the like. The second communication device 14 controls protocols when communicating with other storage nodes 3.

Note that in the case of the first embodiment, as shown in FIG. 2, each storage node 3 is managed in a group called the cluster 6, together with one or multiple other storage nodes 3. The example of FIG. 2 shows the case of setting up only one cluster 6. However, it is also possible to provide multiple clusters 6 within the information processing system.

<2. Programs and Information Stored in the Memory of Each Storage Node>

Next, an example of various processes in the information processing system 1 is described. First, referring to FIGS. 4 and 5, a description is given of programs and information stored in the memory 11 (FIG. 3) of each storage node 3 in relation to various functions.

Figure 4:
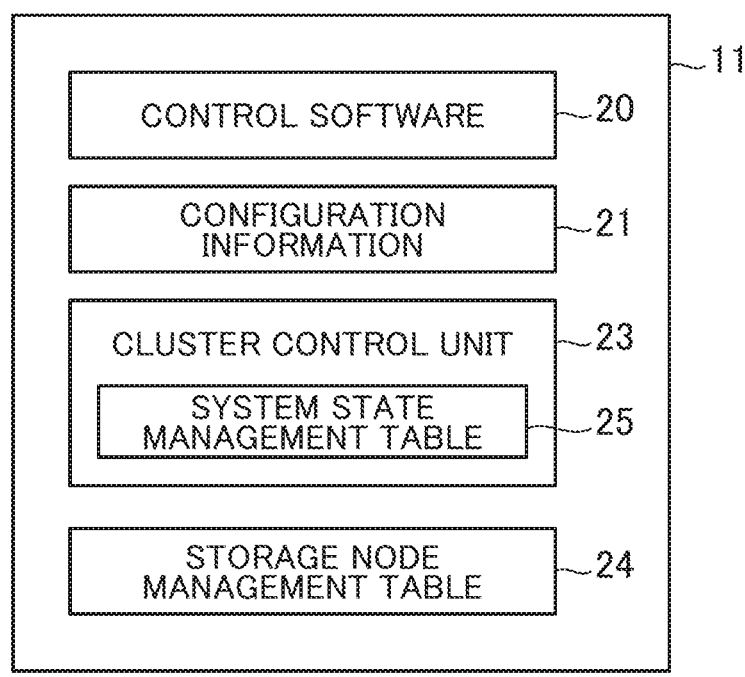
FIG. 4 shows the first embodiment of the present invention, which is a block diagram showing an example of the program and data stored in a memory of the storage node.

FIG. 4 is a block diagram showing an example of the programs and data stored in the memory 11 of the storage node 3. As shown in FIG. 4, multiple pieces of control software (hereinafter, referred to as control software) 20, multiple pieces of configuration information 21 prepared corresponding to each piece of the control software (first control units) 20, a cluster control unit (second control unit) 23, and a storage node management table 24 are stored in the memory 11 of each storage node 3.

The control software 20 is software that functions as a storage controller of SDS (Software Defined Storage). The control software 20 has a function for receiving read and write requests from the compute node 2, and reading and writing data of the corresponding storage device 12 (FIG. 3). The control software 20 can also be referred to as storage control unit or storage control program.

Further, it is also possible to adopt a configuration in which a hypervisor runs on the server, one or more virtual computers run on the hypervisor, and the various programs shown in FIG. 4 run on the virtual computer. In other words, the various programs (control software 20, cluster control unit 23) can run on the hardware of the physical computer or can run on the virtual computer.

Similarly, the compute node 2 can be an application program (host program) running on the virtual computer or it can be a physical host computer (host computer). When the information processing systems 1 has multiple servers, some of the servers may be present in a different site. Further, some or all of the servers of the information processing system 1 may also be present on the cloud to provide services to users through a network.

It is possible to adopt a configuration in which the virtual computer on which the various programs (control software 20, cluster control unit 23) run, and the virtual computer on which the host program runs reside on the same server (node) (hyper converged infrastructure) or on different servers connected through a network.

The system state management table 25 stored within the cluster control unit 23 manages the state of the whole information processing system based on the state of each storage node 3 configuring the information processing system 1.

Figure 7:
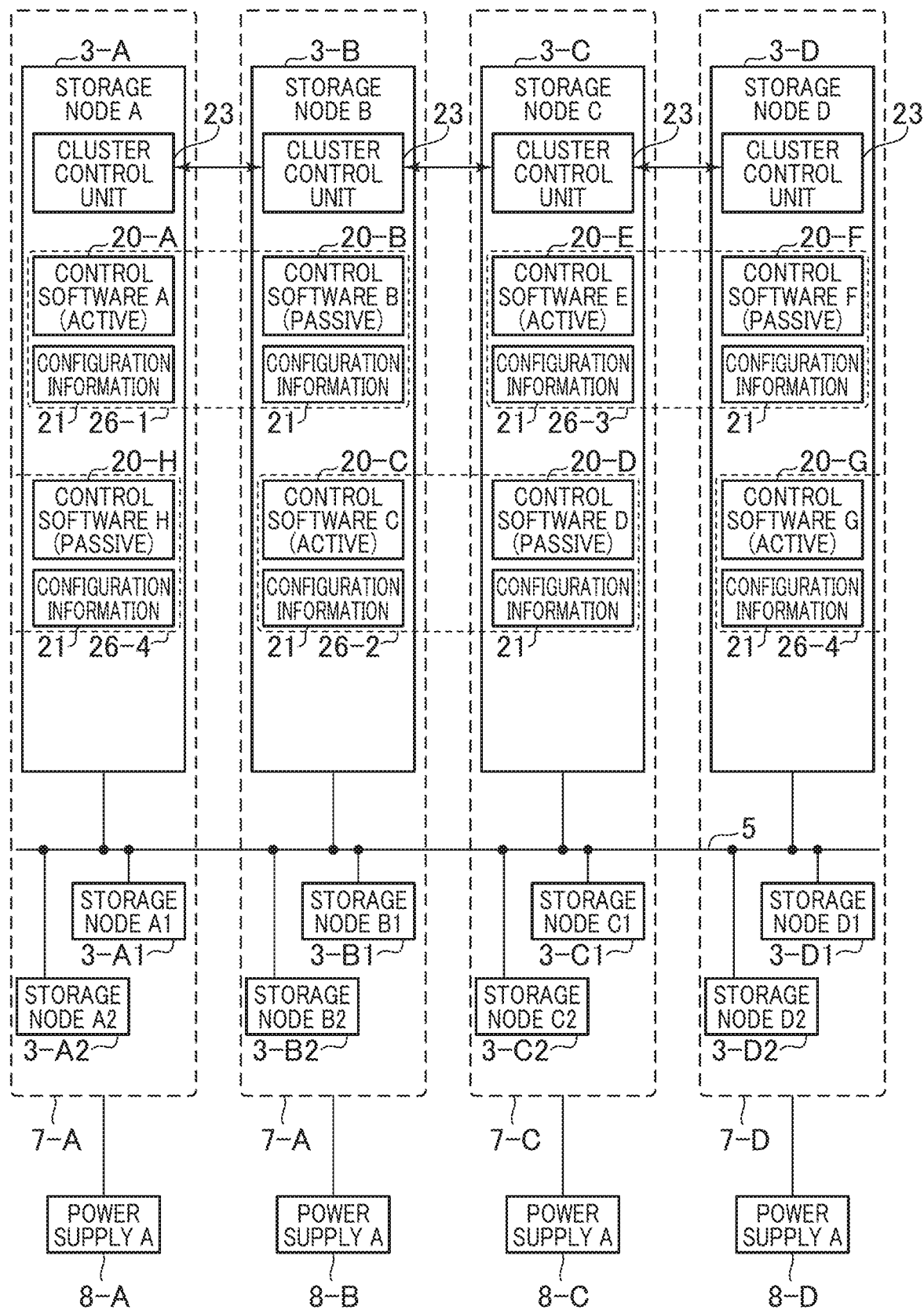
FIG. 7 shows the first embodiment of the present invention, which is a block diagram showing an example of a redundant configuration.

An example of the redundant configuration according to the present embodiment is shown in FIG. 7. The control software 20 implemented in each storage node 3 forms a redundancy group 26 with one or more pieces of other control software 20 that are separately implemented in other storage nodes 3.

Note that FIG. 7 shows the case in which the redundancy group 26 is configured with two pieces of control software 20. In the following description, it is also assumed that the redundancy group 26 is configured with two pieces of control software 20. However, the redundancy group 26 can also be configured with three or more pieces of control software 20.

In the redundancy group 26, at least one control software 20 is set to the state of being able to receive read and write requests from the compute node 2 (which is the active system state and hereinafter referred to as active mode). Further, the remaining pieces of control software 20 are set to the state of not receiving read and write requests from the compute node 2 (which is the standby system state and hereinafter referred to as passive mode).

Thus, the redundancy group 26 configured with two pieces of control software 20 have either of the following configurations: One is that the two pieces of control software 20 are both set to active mode (hereinafter referred to as active-active configuration). The other is that one control software 20 is set to active mode and the other control software 20 is set to passive mode as a backup (hereinafter referred to as active-passive configuration).

Then, in the redundancy group 26 in which the active-passive configuration is adopted, when a failure occurs in the control software 20 set to active mode or in the storage node 3 on which the particular control software 20 runs, or when the storage node 3 in active mode is removed from the cluster 6 (the storage node 3 is deleted), the state of the control software 20 having been set to passive mode is switched to active mode.

In this way, when the control software 20 set to active mode can no longer run, the I/O (Input/Output) process that the particular control software 20 has performed can be taken over by the control software 20 having been set to passive mode (failover function).

In order to achieve such a failover function, the control software 20 belonging to the same redundancy group 26 constantly store the configuration information 21 of the same content.

Then, when the configuration information 21 of the active-mode control software 20 that configures the redundancy group 26 is updated, the difference between the configuration information 21 before update and the configuration information 21 after update is transferred, as differential data, to the other control software 20 that configures the particular redundancy group 26. Based on this differential data, the configuration information 21 held by the particular control software 20 is updated by the other control software 20. In this way, the configuration information 21 held by each piece of the control software 20 that configure the redundancy group 26 is constantly synchronized.

In this way, the two pieces of control software 20 that configure the redundancy group 26 can constantly maintain the configuration information 21 of the same content. With this configuration, when a failure occurs in the control software 20 set to active mode or in the storage node 3 in which the particular control software 20 is provided, or even when the particular storage node 3 is removed, the other control software 20 within the same redundancy group 26 as the particular control software 20 can immediately take over the process that the particular control software 20 has performed so far.

The cluster control unit 23 is a program having a function for transferring an I/O request, which is a write or read request received from the compute node 2, to the cluster control unit 23 of the corresponding storage node 3 through the backend network 5, and giving the I/O request transferred from the other cluster control unit 23 to the control software 20 of the corresponding redundancy group 26. The cluster control unit 23 can also be referred to as cluster control software or cluster control program.

As a means of performing such a series of processes, the cluster control units 23 share information indicating to which storage node 3 each piece of the control software 20 residing within the cluster 6 is allocated, to which redundancy group 26 each piece of the control software 20 belongs, and to which state (active mode or passive mode) each piece of the control software 20 is set. The cluster control unit 23 stores and manages such information in a control information table (not shown).

On the other hand, as described above, the configuration information 21 is configured with information necessary for the control software 20 to achieve various functions such as capacity virtualization function, hierarchical storage control function, snapshot function, remote copy function, deduplication function, and compression function.

The storage node management table 24 is a table used for managing parameters such as the load state of each storage node 3 within the same cluster 6. FIG. 5 is a diagram showing an example of the structure of the storage node management table 24.

As shown in FIG. 5, in the storage node management table 24, one entry is configured from node ID column 24A, state column 24B, capacity column 24C, used capacity column 24D, CPU load column 24E, memory amount column 24F, used memory amount column 24G, used communication bandwidth column 24I, and failure group ID column 24J. In the storage node management table 24, one row (entry) corresponds to one storage node 3.

Then, the node ID of each storage nodes 3 configuring the cluster 6 is stored in the node ID column 24A, and the current state ("normal" or "abnormal (or failure)" of the corresponding storage node 3 is stored in the state column 24B.

Further, the capacity of all the storage devices 12 corresponding to the storage node 3 is stored in the capacity column 24C, and the used capacity of the current storage device 12 in the corresponding storage node 3 is stored in the used capacity column 24D.

Further, the current usage of the CPU 10 (FIG. 3) in the corresponding storage node 3 is stored in the CPU load column 24E, the capacity of the memory 11 (FIG. 3) in the particular storage node 3 is stored in the memory capacity column 24F, and the current usage of the memory 11 in the corresponding storage node 3 is stored in the used memory amount column 24G.

Further, the size of the communication bandwidth of the backend network 5 that the corresponding storage node 3 can use is stored in the communication bandwidth column 24H. The bandwidth amount of the backend network 5 that the particular storage node 3 currently uses for communication with other storage nodes 3 is stored in the used communication bandwidth column 24I.

Further, the group ID of a failure group 7 (FIG. 7) to which the corresponding storage node 3 belongs is stored in the failure group ID column 24J. Here, the failure group 7 means, as describe below, the group of storage nodes 3 sharing the same power supply 8 (to receive power supply) or other components, in which similar failures occur due to the occurrence of a failure in the power supply 8 or other components.

The information stored in the storage node management table 24 is the information shared by the cluster control units 23 of all the storage nodes 3 configuring the same cluster 6. In this way, as a means of sharing the same information by the cluster control units 23 of each of the storage nodes 3 within the same cluster 6, one cluster control unit 23 is selected as the representative cluster control unit 23, by using a predetermined method, from the cluster control units 23 respectively mounted on the storage nodes 3 configuring the cluster 6.

Then, the representative cluster control unit 23 collects necessary information from the cluster control units 23 of the other storage nodes 3 on a regular basis, and updates the storage node management tables 24 managed by the respective cluster control units 23, based on the collected information.

Further, the representative cluster control unit 23 transfers the collected information to the cluster control units 23 of each of the storage nodes 3 within the particular cluster 6, to allow the cluster control units 23 to update their storage node management tables 24 that the respective cluster control units 23 manage.

However, it is also possible that the cluster control unit 23 of each storage node 3 transmits necessary information to the cluster control units 23 of the remaining other storage nodes 3 within the same cluster 6 on a regular basis. Then, the cluster control unit 23 of each storage node 3 can update the storage node management table 24 within its own node, based on the information.

In FIG. 7, an example of the failure group 7 (7-A to 7-D) is also shown. Storage node A, storage node A1, and storage node A2 are a storage node Group that shares the same power supply 8-A. In this way, when the same power supply 8 (8-A to 8-D) or the like is shared and when a failure occurs in the shared power supply 8 or the like, a group of storage nodes 3 in which similar failures occur due to the failure in the shared power supply 8 is defined as the failure group 7. With respect to storage nodes B, C, and D, each storage node similarly has its failure group 7.

FIG. 6 is a diagram showing an example of the structure of the system state management table 25. The system state management table 25 is the table used for managing the state of the whole information processing system based on the state of each storage node 3 configuring the information processing system 1.

In the system state management table 25, as shown in FIG. 6, one entry is configured from state column 25A, initially active storage node number column 25B, active storage node number column 25C, normal storage node number column 25D, and failed storage node number column 25E. The system state management table 25 is stored in the cluster control unit 23.

Then, the state of the information processing system 1 is stored in the state column 25A. For example, the state in which the storage nodes 3 to run within the information processing system 1 all normally run at system startup is defined as "normal". Further, the state in which failed storage node 3 is present among the storage nodes 3 within the information processing system 1 is defined as "x node failure occurring". The state in which the redundant configuration is modified by copying again the data stored in the failed storage node into other data is defined as "redundant configuration". Further, the state in which data is lost or the redundant configuration is not configurable is defined as "data lost".

The number of storage nodes normally running at system startup is stored in the initially active storage node number column 25B. The number of storage nodes currently running is stored in the active storage node number column 25C. The number of nodes normally running among the active storage nodes is stored in the normal storage node number column 25D. The number of failed nodes among the active storage nodes is stored in the failed storage node number column 25E.

<3. Process in Storage Node Normal Operation>

FIG. 7 shows an example of the process in the information processing system 1 when a write request is given to any of the storage nodes 3 within the cluster 6 from the compute node 2 in normal operation.

In FIG. 7, "storage node A" to "storage node D" respectively represent the storage node 3, and "control software A" to "control software H" respectively represent the control software 20.

Then, FIG. 7 shows an example of configuring redundancy groups as follows: "Control software A" running on "storage node A" and "control software B" running on "storage node B" configure a redundancy group 26-1, "control software C" running on "storage node B" and "control software D" running on "storage node C" configure a redundancy group 26-2, "control software E" running on "storage node C" and "control software F" running on "storage node D" configure a redundancy group 26-3, and "control software G" running on "storage node D" and "control software H" running on "storage node A" configure the same redundancy group 26-4.

Further, the example of FIG. 7 assumes that the configuration of each redundancy group 26 generated by making the control software 20 redundant is active-passive configuration.

Then, when a write request is given from the compute node 2 to any of the storage nodes 3 within the cluster 6, a writing process is performed by the control software 20 set in active mode.

Then, when such a writing process is performed, "storage node A" to which "control software A", which performed the writing process, is allocated updates the configuration information 21 held by "control software A", according to the process content of the writing process. "Storage node A" transmits differential data indicating the difference between the configuration information 21 before update and the configuration information 21 after update, to the control software 20 ("control software B") that configures the same redundancy group 26-1 as "control software A" having performed the writing process, from the cluster control unit 23 within the same storage node 3 ("storage node A").

Based on the differential data, "storage node B" updates and synchronizes the configuration information 21 held by "control software B" in the same way as in the configuration information 21 held by "control software A".

In this way, the two pieces of configuration information 21 held by the two pieces of control software 20 ("control software A" and "control software B") that configure the same redundancy group 26, are synchronized to the same content.

<4. Process Upon Occurrence of Storage Node Failure>

When a failure occurs in the storage node 3 within the information process system the information processing system 1, which is the SDS system, desires to continue operating while maintaining the redundant configuration and avoiding stopping the system as much as possible.

However, after a failure occurs in a certain storage node 3 and before completion of the (rebuild) process for data redundancy recovery, another failure may occur in a different storage node 3. Such a case may lead to data lost or being unable to recover the redundant configuration of the data, causing the system to be stopped.

When a failure first occurs in the storage node 3, if the "probability that a failure will occur next and the information processing system will stop" is high, the maintenance work such as changing the failed storage node to a normal storage node should be prioritized over the rebuild process, even at the cost of temporarily stopping the information processing system 1. Data lost is the state that should not occur.

Thus, the cluster control unit 23 calculates the "probability that a failure will occur next and the information processing system will stop" from a certain state, and determines the priority by comparing the calculated value with a predetermined threshold to decide whether to continue the operation or whether to immediately perform maintenance work for the currently occurring failure.

In the present embodiment, the "probability that a failure will occur next and the system will stop" from a certain state is referred to as the availability level.

<4.1 State Transition Upon Occurrence of Storage Node Failure>

The transition of the state of the information process system when a failure occurs in the storage node 3 is described with reference to FIG. 9.

Figure 9:
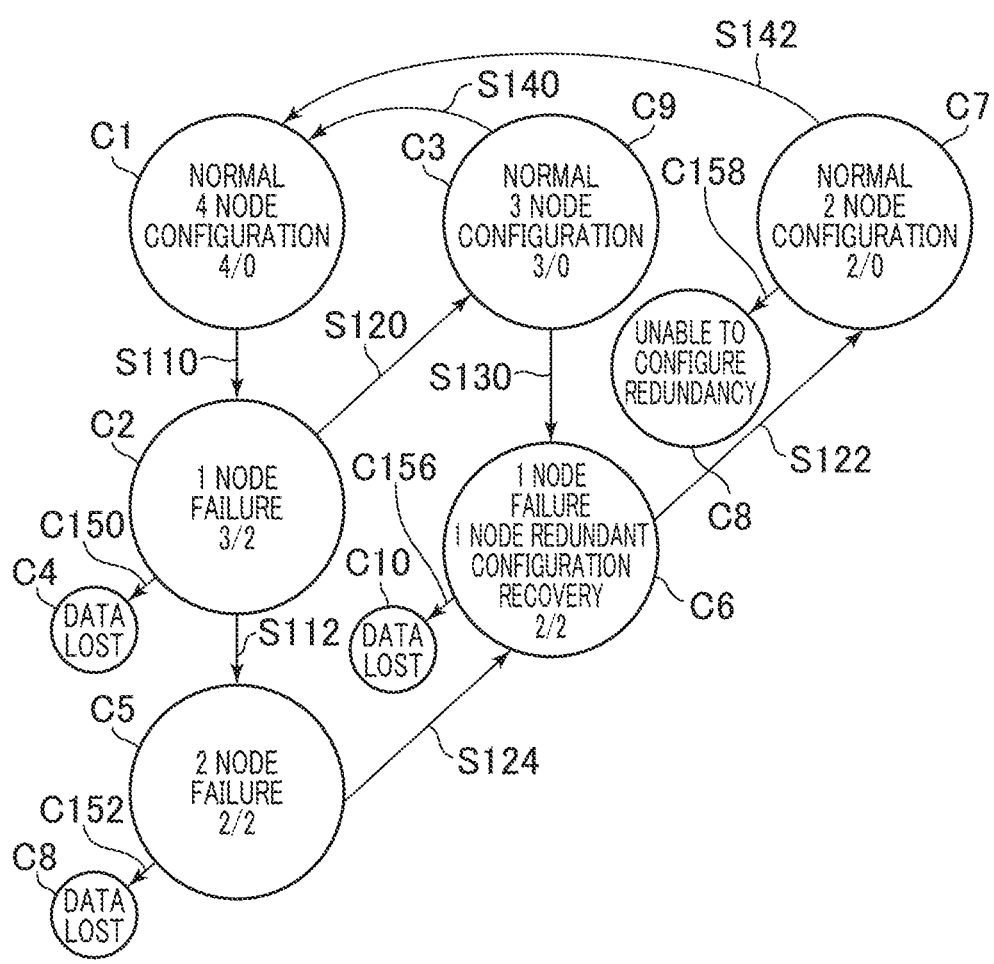
FIG. 9 shows the first embodiment of the present invention, which shows an example of a state transition diagram associated with failure of the information processing system.

FIG. 9 is a state transition diagram showing how the state transits when failure occurs in the information processing system 1, using the configuration example of FIG. 7. The information processing system 1 includes four storage nodes 3, in which data redundancy is achieved by duplicating the data stored in each storage node 3 among different storage nodes 3.

The state of the whole information processing system 1 is one of the following states: "Normal n node configuration" state in which all the storage nodes 3 normally run; "n node failure currently occurring" state in which some storage nodes within the system are failed and unable to be accessed; "normal n node configuration" state in which the redundant configuration is recovered by copying the data into the remaining normal storage nodes after removal of the failed storage node; and "data lost" state in which the information processing system 1 stops. In FIG. 9, n=4.

The circle in FIG. 9 represents the state of the system. Each circle represents the state of the information processing system 1, the number of normal storage nodes normally running within the information processing system 1, and the number of storage nodes with which the redundant configuration of the data of the failed storage node can no longer be maintained (hereinafter, the number of non-redundant configuration storage nodes), in the form of "the number of normal storage nodes/the number of non-redundant configuration storage nodes".

The number of non-redundant configuration storage nodes is part of the number of normal storage nodes. Thus, when the number of non-redundant configuration storage nodes exceeds the number of normal storage nodes, the number of normal storage nodes is taken. When the number of normal storage nodes is 1, the redundant configuration is not established and the system is stopped.

The initial state when the information processing system 1 starts up, as well as the state in which all the storage nodes 3 normally run are normal state. In the example of the figure, the number of normal storage nodes 3 is four and the number of non-redundant configuration storage nodes is zero, so that "normal 4 node configuration" "4/0" are specified in circle C1.

Individual failure within the node of the storage node 3 (for example, partial failure among the CPU, the memory, and the disk device) degenerates if each hardware resource is redundant within the storage node 3 and the storage node 3 continues running. At this time, the cluster control unit 23 can be notified undergoing degeneration but not of detailed failure information. This is because the failure within the storage node 3 is designed to be resolved within the storage node 3. When the storage node 3 itself is unable to run, the other storage nodes 3 recognize that a failure occurs in the storage node 3.

When a failure occurs in one of the storage nodes 3, the state transits from the normal state to the next state (S110). Circle C2, which is the transition destination, is "1 node failure" in which the number of normal storage nodes and the number of non-redundant configuration storage nodes are "3/2". This shows that when one storage node is failed, there are two storage nodes likely to store data to which the data within the failed storage is redundant.

When a failure occurs in the storage node A in FIG. 7, the cluster control unit 23 copies the data managed by the control software A stored in the storage node A, and the data managed by the control software H stored in the storage node A. The two data are copied to the storage node B and to the storage node D. When the storage nodes B and D are failed next, the data is lost and the system is stopped.

Figure 8:
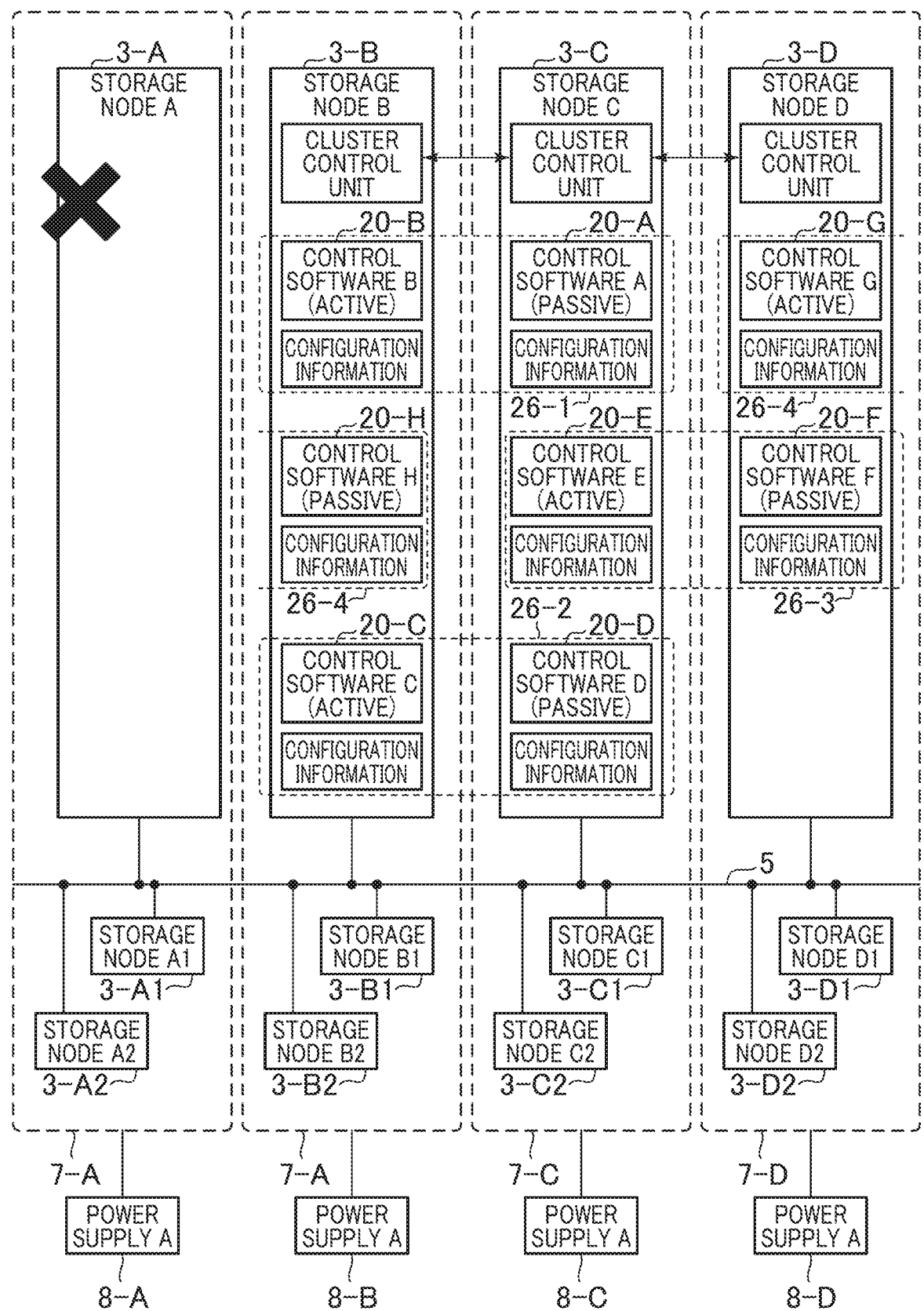
FIG. 8 shows the first embodiment of the present invention, which is a block diagram showing an example of the configuration after completion of redundancy recovery processing.

Of the four storage nodes 3, a failure occurs in one storage node 3. In this state, non-redundant data exists. Thus, the cluster control unit 23 performs a rebuild process to recover the redundant configuration. When the rebuild process is completed, the state transits to "normal 3 node configuration" "3/0" shown by circle C3 (S120). FIG. 8 shows an example of this state.

Of the four storage nodes 3, a failure occurs in one storage node 3. It is assumed that the rebuild process could not be competed from this state in which the particular storage node 3 is still failed, and another failure occurs in one of the remaining storage nodes 3. At this time, a failure occurs in the storage node 3 that stores data to which the data stored in the previously failed storage node is redundant. This case is data lost shown in circle C4 and the system is stopped (S150).

Of the four storage nodes 3, a failure occurs in one storage node 3 (circle C2) "1 node failure" "3/2". It is assumed that the rebuild process could not be completed from this state in which the Particular storage node 3 is still failed, and another failure occurs in one of the remaining storage nodes 3. This case is shown in step S112.

In step S112, it is assumed that a failure occurs in a storage node other than the storage node storing data to which the data stored in the previously failed storage node is redundant. This case is not data lost, so that the system can continue its operation. This state is represented as "2 node failure" "2/2" of circle C5.

Of the four storage nodes 3, failures occur in two storage nodes 3, and in this state the rebuild process is performed on one of the two failed storage nodes to recover the redundant configuration of the data. In this case, the state transits to "1 node failure 1 node redundant configuration recovery" "2/2" shown in circle C6 (S124).

The cluster control unit 23 performs a process of duplicating the data stored in one of the two failed storage nodes 3, to recover the redundant configuration for one storage node 3. In this case, the number of normal storage nodes does not increase, so that the number of normal storage nodes remains two and the number of non-redundant configuration storage nodes remains two. Further, when the redundant configuration of the remaining failed storage node is recovered, the state transits to "normal 2 node configuration" "2/0" shown in circle C7 (S122).

Of the four storage nodes 3, failures occur in two storage nodes 3, and in this state another failure occurs in one storage node 3. This case is data lost shown in circle C8 and the system is stopped (S152).

Next consider the case of information processing system configured with three storage nodes 3 of the information processing system 1.

The state of "normal 3 node configuration" "3/0" (circle C9) is the state in which only three normal storage nodes 3 are running. Form this state, when a failure occurs in one of the storage nodes 3, the system transits to the state of "1 node failure 1 node redundant configuration recovery" "2/2" (circle C6) (S130).

The state of "1 node failure 1 node redundant configuration recovery" "2/2" (circle C6) is the state in which a failure occurs in one of the three storage nodes 3. It may also be possible that the state transits from the state in which failures occur in two of the storage nodes 3. In order to recover the redundant configuration of the data stored within the failed storage node 3, when the cluster control unit 23 performs a rebuild process and completes the process, the state transits to the state of "normal 2 node configuration" "2/0" (circle C7) (S122).

Before the completion of the rebuild process, a failure occurs in one storage node from the state of "1 node failure 1 node redundant configuration recovery" "2/2" (circle C6). This case is data lost (circle C10) and the information processing system 1 is stopped (S156).

The state of "normal 2 node configuration" "2/0" (circle C7) is the state in which only two normal storage nodes 3 are running. If a failure occurs in one of the storage nodes 3, the number of normal storage nodes is one with which the data is unable to be held in the redundant configuration. Thus, the state transits to circle C8 to stop the system (S158).

Additional normal storage nodes 3 may be provided by a replacement of the storage node 3, or other methods (S140, S142). There is no data stored in the added storage node 3. Thus, in order to equalize the load of each storage node 3, the cluster control unit 23 may perform a process of reallocating the data stored within the existing storage node 3 into the added storage node 3. This process equalizes the load, for example, based on the CPU load, the amount of free memory, and the size of the available bandwidth of the backend network 5.

Failure may occur in multiple storage nodes 3 at the same time from the normal state. However, more precisely, it can be understood that the state transition is such that a failure of the next node occurs through the occurrence of node failure in a one-by-one manner. Thus, it can be thought that the probability that failure occurrence or failure recovery will occur at the same time in two or more parts can be approximated to zero. For this reason, in the present embodiment, it is assumed that there is no transition from the normal state to the occurrence of failure in multiple storage nodes. The same concept is applied to state transitions from other states.

<4.2 Calculation Method of the State Transition Probability>

Figure 10:
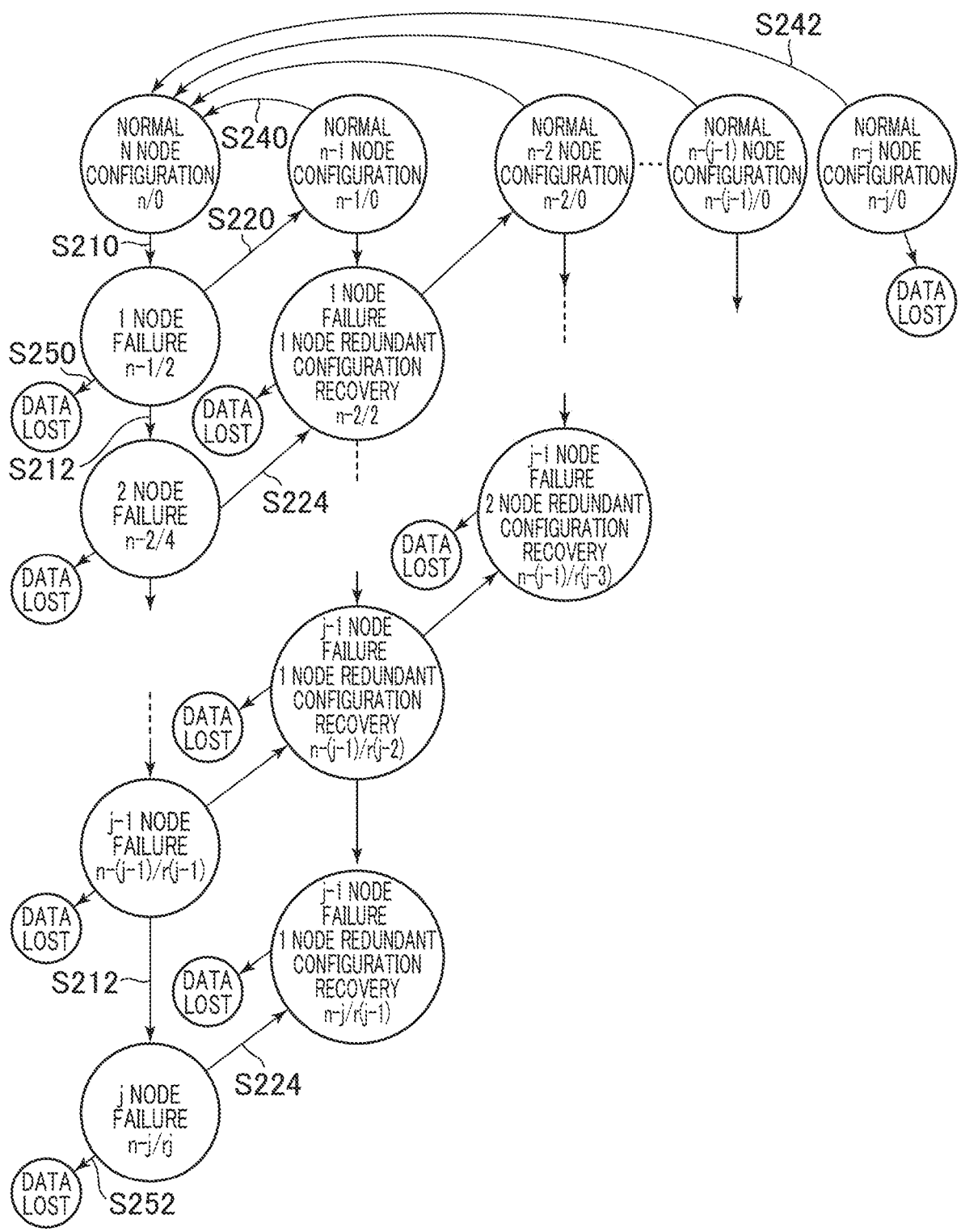
FIG. 10 shows the first embodiment of the present invention, showing an example of a state transition diagram associated with failure of the information processing system.

On the basis of the state transition in FIG. 6, a generalized state transition diagram is shown in FIG. 10, which shows an example of calculating the probability of transition from each state to the next state.

The information necessary to calculate the state transition Probability includes the following: the probability that failure will occur in the storage node 3 and the probability that rebuild will be completed.

For example, the probability that failure will occur (failure rate) is previously set by the administrator or user by inputting a value calculated from the result of monitoring the existing information processing system 1, or a value calculated using the result of simulation or the like. Further, the probability that the rebuild process for recovering the failed storage node will be completed can be calculated taking into account the leading time for adding more storage nodes 3, the processing time for moving data, the policy for allocating data, and the like, which will be described below.

To simplify the description, it is assumed that the probability that the storage node 3 will fail, namely, the failure rate $\lambda$ is the value equivalent for all storage nodes 3. As described above, failures occurring in each node are handled individually within the node.

Thus, there may be a case in which some storage nodes 3 are in fallback operation. The probability that failure will occur in the storage node 3 during fallback operation is different from the probability in the normal storage node 3. Actually, it is necessary to calculate the probability on each case. The fact that the failure rate $\lambda$ differs depending on the storage node 3 is independent of the nature of the invention. Thus, the following description assumes that the failure rate of the individual storage nodes 3 is calculated using the same value.

The probability that the rebuild process will be completed is calculated from the time for rebuild, as the probability that rebuild will be completed per unit time. The rebuild process is the process for establishing the redundant configuration by copying the data stored in the failed storage node in which the redundant configuration is no longer maintained due to failure, into the normal storage node 3.

The present embodiment describes an example of making double redundancy. The time required for the process of copying data to the storage node 3 is calculated by dividing the amount of data to be copied by the number of processes per unit time (throughput).

The amount of data to be copied is the amount obtained by dividing the amount of data of the whole information processing system 1. Here, it is assumed that the data amount is constant in each storage node 3. The rebuild process is the process of reading and writing target data, which is dominated by the reading process and uses the read throughput.

It is assumed that the number of storage nodes of the information processing system 1 is n, and the number of failed storage nodes of n storage nodes is j. The number of normal storage nodes normally running within the information processing system 1 can be expressed as n−j. The number of normal storage nodes is n in the initial state.

Failure occurring in the storage node 3 within the information processing system 1 may lead to a state in which, although not data lost, the redundant configuration of at least part of the data is not maintained.

It is assumed that the number of storage nodes unlikely to be able to maintain the data redundant configuration due to the influence of the occurrence of failure in any of the storage nodes 3 (hereinafter, the number of non-redundant configuration storage nodes) is m. For example, in the configuration in which data is copied as shown in FIG. 7, when a failure occurs in any of the storage nodes 3, the number of non-redundant configuration storage nodes is two because the data is duplicated on the storage nodes 3 located on the left and right sides of the failed storage node.

Further, when two storage nodes are failed, the number of non-redundant configuration storage nodes is four (although the number of non-redundant configuration storage nodes may also be three, this case adopts a larger influence of failure). The number of non-redundant configuration storage nodes is also the number of normal storage nodes, so that the number of non-redundant configuration storage nodes is unlikely to exceed the number of normal storage nodes.

When the number of non-redundant configuration storage nodes numerically exceeds the number of normal storage nodes, the number of non-redundant configuration storage nodes is assumed to be equal to the number of normal storage nodes.

Based on the above assumptions, the number m of non-redundant configuration storage nodes can be expressed as follows:

$$m = \min(j*r, n-j)$$

n: number of storage nodes
j: number of failed storage nodes
r: redundancy where r is the redundancy, and r=2 when data is duplicated double as shown in FIG. 7.

When a failure occurs in a non-redundant configuration storage node, it leads to data lost and the system is stopped. Further, when the number of normal storage nodes is one within the information processing system 1, the redundant configuration may not be established and the system is similarly stopped.

Assuming that the failure rate of each storage node 3 is $\lambda$, the following facts are given:

The probability that one storage node will normally run is $(1-\lambda)$

The probability that all of the n storage nodes will normally run is $(1-\lambda)^n$ The probability to transit from the "normal" state, which includes the normal state in which the storage node 3 normally runs and the normal state in which the redundant configuration is recovered, to the state of "1 node failure" in which a failure occurs in one storage node is considered to be other than the "state in which all nodes normally run". The probability to transit to S210 can be expressed as follows:

The probability to transit to the state of one node failure is $1-(1-\lambda)^n$ As described above, the case in which failures simultaneously occur in multiple storage nodes 3 is also assumed to be the same as the case in which the transient interval of failure of individual nodes is extremely short, and so the state transitions are put into one state transition.

In FIG. 10, the probability that the state will transit to steps S210 and S212 when failed storage node occurs is equal to the probability that (n−j−m) storage nodes 3, the number of which is obtained by subtracting the number j of failed storage nodes and the number m of redundant configuration storage nodes from the number n of mounted storage nodes, will not normally run all at once. Thus, the following can be yielded:

The probability to transit to the state of "another one node is failed during node failure" is $1-(1-\lambda)^{n-j-m}$.

From the state in which a failure occurs in one storage node 3, the system transits to the state of starting a rebuild process, the state in which a failure occurs in another storage node 3, or the state remains as it is.

The rebuild process is the process of duplicating all data stored in the failed storage node 3 into other normal storage nodes 3. Assuming that the processing throughput per unit time of the storage node 3 is T, the total data amount within the information processing system 1 is C, and the number of normal storage nodes in the initial state is N (for example, N is 6 because the total data amount does not change even if the number of failed nodes is removed from the number of nodes=6), the following can be yielded:

The redundant data amount c per unit of N storage nodes is C/N

The rebuild rate is c/T

The rebuild rate c/T is the probability of the state transition in Step S220 from the state in which a failure occurs in one storage node 3 to the state in which the rebuild process is performed to recover to the normal state.

When the number of failed storage nodes is j, the process selects the failed storage nodes one by one to recover the redundant configuration of the data stored in the selected failed storage node (S224). It is possible to recover the redundant configuration of all data by performing this process on all the failed storage nodes.

In order to perform the rebuild process, the process requires enough free storage capacity to copy and store data on the side of the normal storage node 3. If there is no free capacity, the rebuild process may not be performed. Thus, when the number of failed storage nodes increases, the system will eventually be unable to perform the rebuild process, resulting in being unable to maintain the redundant configuration.

Further, the case in which the next storage node failure occurs before the rebuild process is completed is multi-failure. In this case also, repeated multi-failure will eventually result in data lost or being unable to maintain the redundant configuration.

In either case, it is necessary to immediately perform maintenance work by stopping the information processing system 1 to recover the system as fast as possible. This also means that there is no need to perform the maintenance work immediately after failure occurrence, as long as the redundancy can be maintained by performing the rebuild process. If the time until the next failure occurs is longer than the time required for rebuild, the rebuild can be completed before the next failure occurs, and similarly there is no need to immediately perform the maintenance work.

In the state in which a failure currently occurs, the cluster control unit 23 determines whether or not to immediately perform maintenance work to recover from the failure, by calculating the probability to transit from a certain state to system stop, and comparing the calculated probability with a predetermined threshold.

Further, in the state in which a failure occurs in one storage node, the probability to transit to the state in which a failure occurs in at least one of the two storage nodes 3, which are the copy destinations of the data stored in the failed storage node, is assumed to be other than the state in which two storage nodes 3 are normally running. This corresponds to the state transition in step S250 of FIG. 10. This state is the system stop state due to data lost. Thus, the following facts are given:

The probability to transit from the node failure to the system stop state is $1-(1-\lambda)^2$ When generalizing the equations, the probability to transit to the state of step S252 is as follows:

The probability to transit from the node failure to the system stop state is $1-(1-\lambda)^m$ Additional normal storage nodes 3 may be provided by replacement or other methods (S240, S242). The time required for replace is the total time of the time for preparing storage node 3 such as reset, and the process time for reallocating the stored data within the existing storage node 3 into the added storage node 3 to equalize the load of each storage node 3. Assuming that the required replace time is R and the replace is performed on every failed storage node, the relationship can be expressed as follows:

The replace rate is i/R

The failure rate λ, the total system storage capacity C, the throughput T, and the replace time R are set to predetermined values. For example, the data are stored in a form as shown in a parameter set value table 36 within the cluster control unit 23 (FIG. 11).

The state transition diagram is completed as shown in FIG. 10. The state of the whole information system can be expressed from the storage node state.

Note that FIG. 11 is a diagram showing an example of the parameter set value table 36. One entry of the parameter set value table 36 includes failure rate 36A, total storage capacity of information processing system 1 36B, throughput 36C, and replace time 36D.

<5. Availability Determination Process>
<5.1 Calculation Method of the Availability Level (S10)>

Based on the state transition probability described above, the cluster control unit 23 calculates the probability of data lost, namely, that the system will be sopped from each state. The storage reliability of the information processing system 1 can be calculated using Markov chain.

As shown in FIG. 10, of the state transition expressions, there are X states that are likely to occur due to the occurrence of events of failure and recovery of the storage node 3, without data lost. Predetermined two states are selected from the X states. At this time, the probability (or time) of the state transition between the two states without system stop can be calculated using the well-known Markov chain equation. This value is defined as the availability level described in the present invention.

For example, Reference Literature 1 (Research on System Software and Operating System (OS), 2015-OS-133, Reliability Evaluation Method of Data Center High Availability System Using Markov Chain (https://ipsj.ixsq.nii.ac.jp/ej/?action=pages_view_main&active_action=repository_view_main_item_detail&item_id=142121&item_no=1&page_id=13&block_id=8)) is known as an example of calculating the system reliability by using Markov chain.

<5.2 Determination of the Availability Level (S20)>

The cluster control unit 23 determines whether to continue the operation of the information processing system 1 or to perform maintenance work, with respect to the availability level calculated as described above. The cluster control unit 23 calculates the probability that the system will eventually be stopped from a certain state. When the probability is equal to or more than a threshold, the cluster control unit 23 performs maintenance work.

When it is determined that the availability level is higher than the threshold, namely, the possibility that failure will next occur and the system will be stopped is extremely low, the cluster control unit 23 decides to continue the operation by the storage node 3 that currently normally runs.

The failed storage node 3 continues the I/O process required by the upper device, by operating the control software 20 within the storage node 3 which is the redundancy destination. The data stored in the failed storage node 3 is not made redundant, so that a rebuild process is performed to generate a copy of the data into the normal storage node 3. The I/O process is continued even during the rebuild process.

In the rebuild process, the cluster control unit 23 determines that the destination storage node 3 has sufficient free area.

User requests for the information processing system 1 often designate a down time within several tens of minutes or 99.999% availability and the method of the present invention is realistic.

At the time when a failure occurs in the storage node 3 or when an event occurs such as increase/decrease of the number of storage nodes 3, the cluster control unit 23 determines the current state. Then, the cluster control unit 23 calculates the probability that the state will transit from the current state to the next state and the system will eventually be stopped. In other words, the cluster control unit 23 calculates the availability level to determine the availability level by the threshold. In this way, the cluster control unit 23 decides whether or not to immediately perform maintenance work.

<5.3 Operation Continuation Process (S30)>

When it is decided to continue operation based on the determination of the availability level, the cluster control unit 23 switches from passive mode to active mode in the control software 20 configuring the redundant group 26. Further, the cluster control unit 23 performs a data redundancy recovery process.

Figure 12:
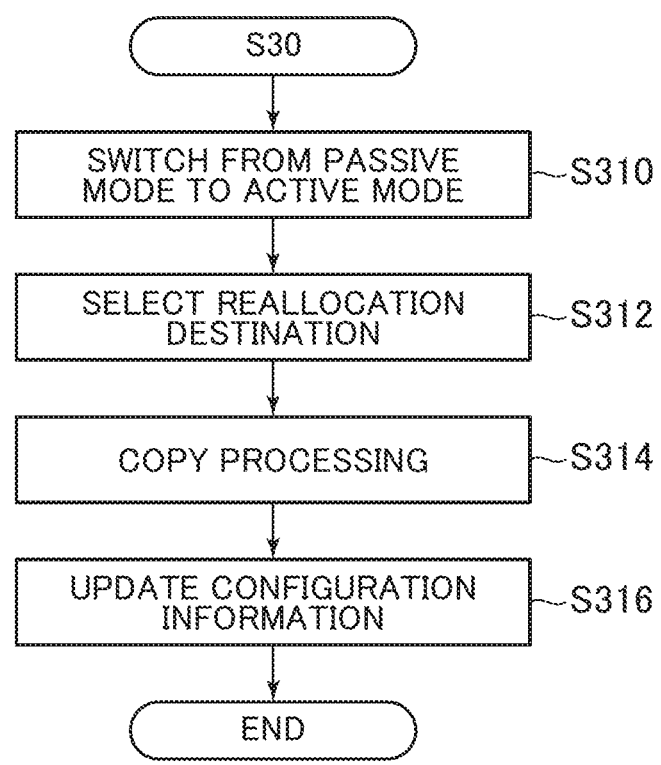
FIG. 12 shows the first embodiment of the present invention, which is a flowchart showing an example of the process when a failure occurs in a storage node.

According to the flowchart in FIG. 12, a description is given of the process when failure occurs in any of the storage nodes 3 configuring the cluster 6 in the information processing system 1. Note that this embodiment describes the process when failure occurs in "storage node A" in FIG. 7 and when "control software A" and "control software H", which are implemented in the "storage node A", are down.

In this case, any of the cluster control units 23 detects the failure and notifies the representative cluster control unit 23 of the particular failure.

Upon receiving the notification, the cluster control unit 23 of "storage node B" changes the state of "control software B", which has been set so far in passive mode, to active mode (S310). In this way, the I/O process that "control software A" has performed so far is taken over by "control software B".

Next, in order to recover the redundant configuration of "control software B", the representative cluster control unit 23 determines the storage nodes 3 to be new destinations of "control software A", and notifies the cluster control units 23 within each of the storage nodes 3 of the determination result.

At this time, the representative cluster control unit 23 refers to the storage node management table 24 (FIG. 5) to select, as a new destination of "control software A", a storage node 3 which is different from the storage node 3 to which another control software 20 configuring the same redundant group 26 has been already allocated, and which belongs to a failure group different from the storage node 3 to which another control software 20 configuring the redundant Group 26 has been already allocated.

Further, when there are multiple selectable storage nodes 3 (storage nodes 3 to be new candidates for the allocation destination of "control software A"), the representative cluster control unit 23 decides storage nodes 3 with a low value for the CPU load 24E as new allocation destinations of "control software A" by referring to the storage node management table 24 of each candidate storage node 3 (S312).

The storage nodes 3 to be candidates for the allocation destination are storage nodes 3 in which the CPU load 24E is low. For example, this means that the storage nodes 3 to be candidates for the allocation destination are selected from the potential candidate storage node 3, and also have the lowest CPU load among the storage nodes 3 in which, if the control software 20 is allocated, the capacity, the CPU load, the memory amount, and the communication bandwidth of the backend network 5 in the storage device of each storage node 3 will not exceed their tolerance limits.

In this embodiment, it is assumed that "storage node C" is determined as the new allocation destination of "control software A" and "storage node B" is determined as the new allocation destination of "control software H", respectively. Note that the "tolerance limit" for the capacity and memory amount means being in the range of the capacity and memory amount of the storage device of the storage node 3, the "tolerance limit" for the CPU load means being equal to or less than 100%, and the "tolerance limit" for the backend network 5 means being in the range of the usable communication bandwidth. If the capacity, the CPU load, the memory amount, and/or the communication bandwidth of the backend network 5 each have a Predetermined threshold, the "tolerance limit" means being in the range of the threshold.

Upon receiving the notification of the allocation destination, the cluster control unit 23 of "storage node B" instructs the own storage node 3 to fully copy the configuration information 21 held by "control software B", to "storage node C" which is the new allocation destination of "control software A".

Further, upon receiving the allocation destination instruction, the cluster control unit 23 transfers the configuration information 21 to "storage node C" through the backend network 5 (S314). Then, the cluster control unit 23 of "storage node C", which received the configuration information 21, associates the configuration information 21 with "control software A" and stores in the memory (FIG. 3).

Note that once the full copy of the configuration information 21 held by "control software B" to "storage node C" is completed, "storage node B" starts transferring the differential data between the updated configuration information 21 and the original configuration information 21 to "storage node C", each time the configuration information 21 held by "control software B" is updated. In this way, the configuration information 21 held by "control software B" and the configuration information 21 copied to "storage node C" are synchronized and updated.

After that, the cluster control unit 23 of "storage node C" activates the control software 20 installed in "storage node C", as new "control software A", in passive mode.

Then, the representative cluster control unit 23 updates the node ID information with which the control software managed by the representative cluster control unit 23 runs, according to the configuration change described above (S316).

The same process as "control software A" performed on "control software H".

As described above, a series of process when a failure occurs in "storage node A" is completed. FIG. 8 shows the configuration example after the completion of the redundancy recovery process. The state transition in FIG. 9 shows the transition from "normal" state to "normal 3 node configuration".

<4.4 Maintenance Work (S40)>

Figure 13:
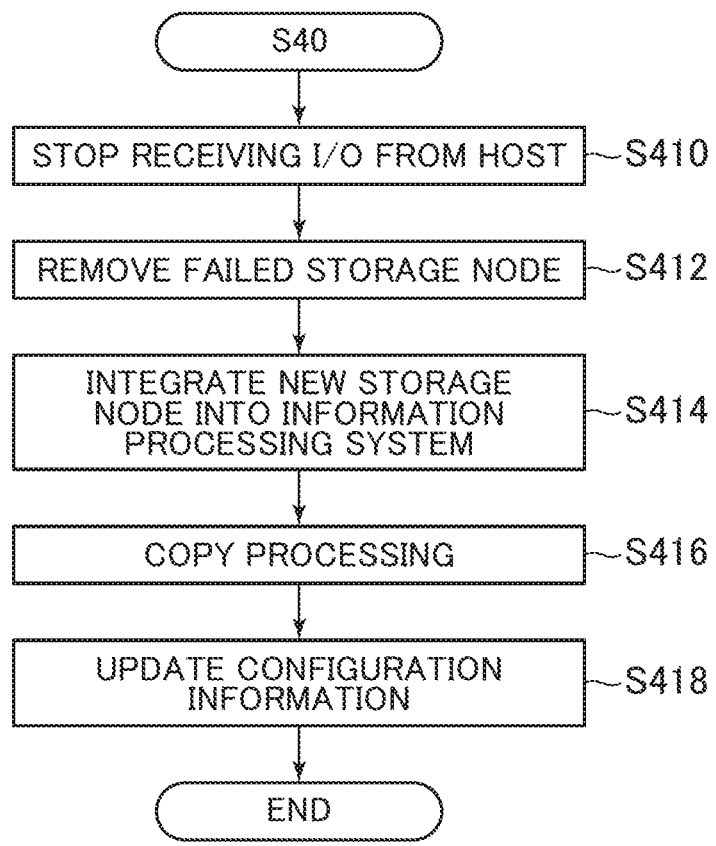
FIG. 13 shows the first embodiment of the present invention, which is a flowchart showing an example of maintenance work process.

Based on the availability level determination, when it is determined that the operation is unable to be continued in the cluster control unit 23, the cluster control unit 23 gives an alert to the administrator to instruct to perform maintenance work (FIG. 13).

According to the flowchart in FIG. 13, a description is given of the process of performing maintenance work when a failure occurs in any of the storage nodes 3 configuring the cluster 6 in the information processing system 13. During maintenance work, the information processing system 1 is temporarily stopped so as not to receive I/O requests from the compute node 2 (S410).

In the maintenance work, first the failed storage node is removed from the information processing system 1. The cluster control unit 23 notifies other cluster control units 23 so that they do not recognize the failed storage node. The cluster control unit 23 deletes the storage node to be removed from the storage node management table 24 (S421). The failed storage node removal process S412 can also include a process of physically moving the failed storage node to a different location.

A new normal storage node 3 is integrated into the information processing system (S414). The cluster control unit 23 registers the new storage node 3 into the storage node management table 24. The cluster control unit 23 puts the new storage node 3 into a cluster configuration (failed group) with the existing failed group 7.

Further, the cluster control unit 23 performs a redundancy recovery process of data whose redundant configuration is not established yet. The cluster control unit 23 searches for storage nodes 3 storing a copy of the data stored in the failed storage node, as well as particular data. Then, as a destination storage node 3 to which the selected data is copied, the cluster control unit 23 selects a storage node 3 other than the searched storage nodes, and fully copies the particular data to the selected storage node 3 (S416). Then, the cluster control unit 23 updates the configuration information of the control software which is the copy destination (S418).

The process shown in FIG. 1 starts by monitoring whether or not failure occurs in any of the storage nodes 3, or by monitoring whether or not a predetermined instruction to remove any of the storage nodes 3 is given, based on whether or not the periodical communication can be performed with the cluster control unit 23 of each storage node 3.

Further, the process in FIG. 1 starts when the free capacity of the storage area of the storage node 3 changes. The recovery of the redundant configuration is based on being able to have enough free capacity to store copy in the corresponding storage node 3. Thus, the process constantly monitors the free capacity of the pool (storage Pool). When the free capacity of the pool is less than a threshold, the process adds a storage node. When there are multiple pools within the information processing system 1, the process determines the free capacity for each pool.

As another example, the following factors are taken into account in the calculation of the probability that the information processing system 1 will continue operation after state transition.

(1) Monitoring of Available Free Capacity

The process monitors that the available free capacity in the storage device 12 is greater than the threshold. If the available free storage capacity is less than the threshold, the capacity of the copy destination may not be enough for the redundant configuration recovery process. In such a case, the probability of the state transition from the "x node failure" state to the "y node redundant configuration" state decreases.

Even excluding the capacity that is unusable due to the occurrence of a failure in the storage node 3, when the usable storage capacity (pool capacity) can be provided to the compute node 2, the system can operate normally.

(2) Monitoring of Free Capacity for Each Tier within the Pool

When there are tiers within the pool, the process monitors the available free capacity described in (1) for each tier within the pool.

(3) Monitoring of Capacity with Failure Group

The failure group 7 is the group of storage nodes 3 sharing the same power supply or the like, in which when a failure occurs in the power supply 8 or the like, similar failure occurs due to the particular power supply 8 or the like.

The process sets up failure groups 7 and monitors the available free capacity described in (1) for each failure group to select a rebuild destination in a different failure group 7. The process monitors whether the available free capacity can be ensured in the selectable rebuild destination.

(4) Monitoring of Performance

The process monitors whether to ensure the performance required for the application to run on the compute node 2. The performance can be determined, for example, by the used capacity of the storage device 12 or the used capacity of the pool. It is also possible to select the storage node 3 to store data used in the application by monitoring the throughput of the storage node 3 as well as the operating rate of the CPU 10.

Note that if the performance required for the application of the compute node 2 is unknown, it is possible to compare a predetermined performance threshold for each resource of the storage node 3 with the performance value obtained by the cluster control unit 23 for each resource, to select the storage node 3 whose performance value exceeds the performance threshold, as the storage node 3 with redundant configuration. As described above, the performance values for each of the resources can be the throughput, the operating rate of the CPU 10, the free storage capacity, and the like.

As described above, in this embodiment, the process calculates the availability level from the current state of the information processing system 1, the part in which a failure can occur next, and the probability that the failure will occur. When the availability is lower than the threshold, the process determines failure and issues a prompt to stop the system for node replacement or addition process. When the availability is higher than the threshold, the process continues the I/O process.

It is possible to determine the necessity for the information Processing system 1 to immediately replace the part. Further, the cluster control unit 23 immediately performs maintenance work such as node replacement or addition, only when the availability level of the information processing system 1 is low. Otherwise, the cluster control unit 23 does not perform maintenance process when the I/O process frequency is high with reference to the operation state of the information processing system 1. When the I/O process frequency is low, the cluster control unit 23 can perform maintenance work.

Thus, the present invention can reduce the operating expense (OPEX) of the information processing system 1, and is effective in operating the large-scale information processing system 1. It is possible to determine whether the I/O process frequency is high or low by a predetermined threshold with the number of I/O operations per unit time.

Further, in the information processing system 1, if any piece of the control software 20 of the redundancy group 26 is no longer able to run due to reduction of storage node 3 or failure occurrence, the configuration information 21 used by an alternative control software 20 or by the disabled control software 20 can be immediately reproduced on an appropriate storage node 3. Thus, it is possible to maintain the redundant configuration of the control software 20 constantly and reliably, and the availability and reliability of the whole information processing system 1 can be improved by that much.

Further, in the information processing system 1, when a storage node 3 is added, any one piece of the control software 20 within the cluster 6 is reallocated in the added storage node 3. Thus, the load of the storage node 3 can be distributed without bothering the administrator, and the management as a whole system can be facilitated by that much.

Second Embodiment

Figure 14:
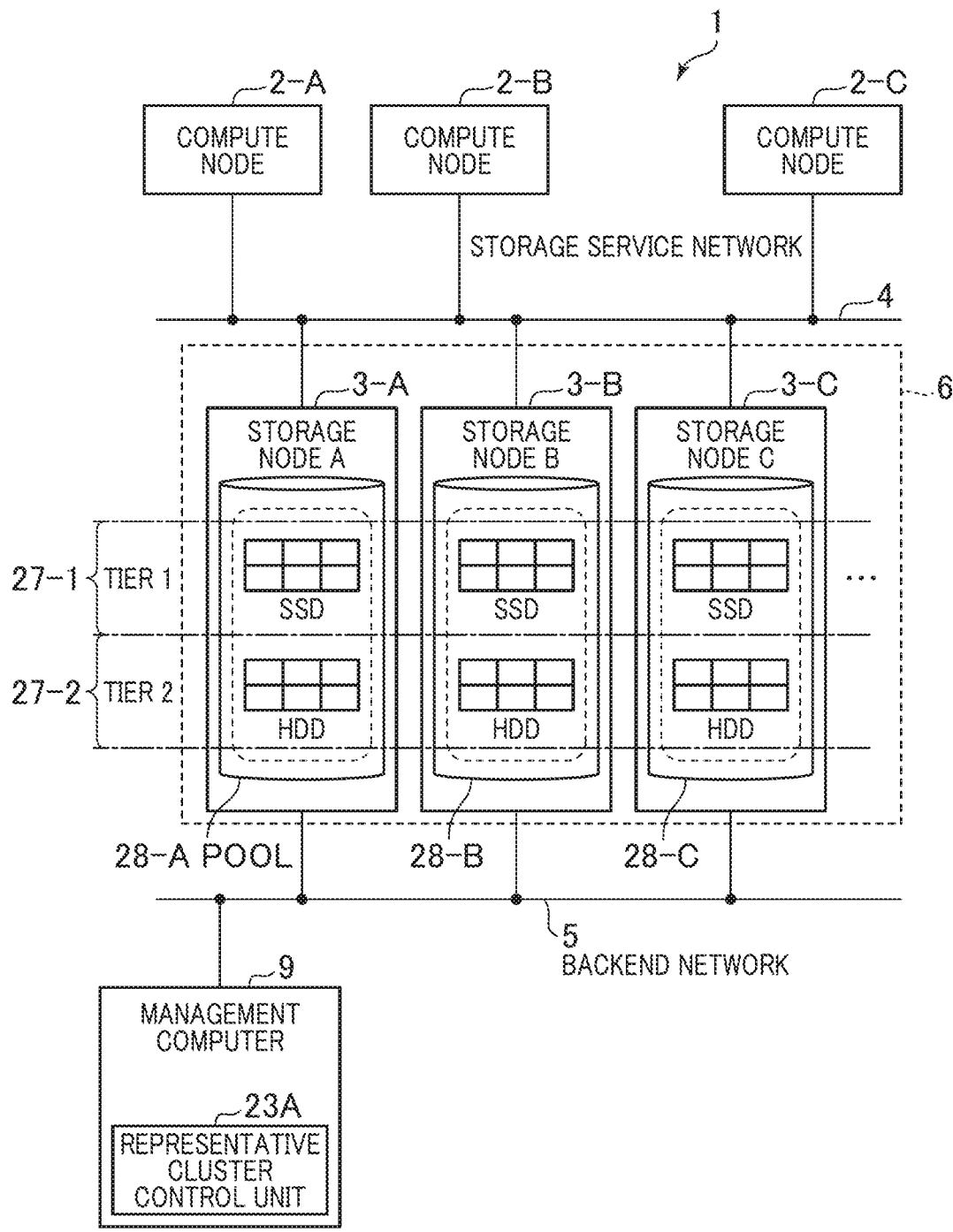
FIG. 14 shows a second embodiment of the present invention, which is a block diagram showing the overall configuration of an information processing system.

FIG. 14 is a block diagram showing a second embodiment of the present invention, which shows the overall configuration of the information processing system 1. In the second embodiment, the storage device 12 is configured with HDD and SSD, in which pools 28-A to 28-C, which are storage areas, are set up for each storage node 3. Further, each pool 28 is managed by Tier 1 and Tier 2 according to the performance of the storage device 12. Then, a management computer 9 is connected to the backend network 5 to operate a representative cluster control unit 23A that works with the cluster control unit 23 of each storage node 3. Other configurations are the same as those of the first embodiment.

Each pool 28 of the storage node 3 includes Tier 1 (27-1) that manages the storage area of SSD as well as Tier 2 (27-2) that manages the storage area of HDD. The representative cluster control unit 23A of the management computer 9 manages the storage capacity for the pool 28 and Tier 27 in each storage node 3.

The representative cluster control unit 23A manages and the storage capacity by the pool 28 of the storage node 3 in the unit of Tier 1 and Tier 2 according to the performance difference in the storage device 12. In this way, it is possible to control the performance of the storage capacity allocated to the redundancy group 26.

Note that the example of the figure shows an example of setting up the pool 28 in each storage node 3. However, although not shown, it is also possible to set up a pool across multiple storage nodes 3. Further, the management computer 9 can run the cluster management software to function as a cluster management unit, instead of the representative cluster control unit 23A.

CONCLUSION

Note that the first and second embodiments show examples in which the present invention is applied to information processing systems in which SDS is implemented. However, the present invention is not limited to these examples and is also applicable to storage systems including redundant configuration.

Further, the first and second embodiments detect failure when it occurs in a storage node. However, the occurrence of failure can also be detected when the storage node is lower than a predetermined value.

Note that the present invention is not limited to the above embodiments and various modifications may be made therein. For example, the exemplary embodiments have been described in detail for a better understanding of the present invention, and the present invention is not necessarily limited to those with all of the configurations described above. Further, a part of the configuration of an embodiment can be replaced with the configuration of another embodiment, and the configuration of a certain embodiment can be added to the configuration of another embodiment. Further, with respect to a part of the configuration of each embodiment, both addition and deletion or replacement of other configurations can be applied alone or in combination.

Further, with respect to each of the configurations, functions, processing units, processing means and the like, a part or all of them may be achieved by hardware, for example, by a design with an integrated circuit. Further, each of the configurations, functions, and the like may be achieved by software in such a way that the processor interprets and executes programs that achieve each of the functions. Information such as programs, tables, and files can be stored in storage devices such as memory, hard disk, SSD (Solid State Drive), or storage media such as IC card, SD card, and DVD.

Further, only control lines and information lines are shown considered to be necessary for the description, and all control lines and information lines on products are not necessarily shown. In practice, almost all of the configurations may be considered to be connected to each other.

What is claimed is:

1. An information processing system comprising:
a plurality of storage nodes including processors, memories, and storage devices; and
a network for connecting the plurality of storage nodes,
wherein a processor of at least one storage node performs the steps of:
obtaining storage node management information related to a configuration of the storage nodes;
obtaining first failure information related to a first failure occurred in the at least one storage node;
calculating a failure occurrence probability that a second failure occurs based on the storage node management information and a rebuild time of a configuration of the information processing system for the first failure information;
calculating an availability level using the rebuild time and the failure occurrence probability, the availability level is a probability of transition to a state where the information processing system is stopped due to a failure;
notifying a necessity of maintenance work based on the availability level; and
controlling an operation of the information processing system based on the availability level by
copying information from one storage node of the plurality of storage nodes to a third storage node of the plurality of storage nodes and upon completion of the copying transfers differential data from the one storage node to the third storage node, on a condition that the availability level is higher than a threshold, and
searching the plurality of storage nodes for a copy of data stored in the at least one storage node with the first failure and additional data, selecting a storage node that does not contain a copy of the data and the additional data and copies the data and the additional data, on a condition that the availability level is lower than the threshold.

2. The information processing system according to claim 1, wherein the processor calculates the availability level by calculating the failure occurrence probability that the second failure will occur during rebuild operation after the first failure occurs.

3. The information processing system according to claim 2, wherein the rebuild time includes a time for reallocating data stored in the storage node, in which the first failure occurs, to another storage node.

4. The information processing system according to claim 3, wherein the rebuild time includes time for adding a storage node to which the data is reallocated.

5. The information processing system according to claim 1,
wherein each of the processors include:
a first control unit for controlling reading and writing for a storage device; and
a second control unit for clustering storage node in cooperation with other nodes while calculating the availability level.

6. The information processing system according to claim 1,
wherein a group of the plurality of storage nodes to which failure is linked is set up as a failure group, and
wherein, according to the failure occurrence probability used for the calculation of the availability level, failures will occur at the same time in a plurality of storage nodes within the failure group upon occurrence of a failure.

7. The information processing system according to claim 1, wherein the availability level is calculated based on the failure occurrence probability that the second failure will occur, as well as an operational continuity of the information processing system when the second failure occurs.

8. The information processing system according to claim 7, wherein the operational continuity is conditional on having a predetermined redundancy or having a predetermined I/O performance.

9. The information processing system according to claim 1, wherein
on the condition that the availability level is higher than the threshold the processor determines that the next state is not a failure state, and
on the condition that the availability level is lower than the threshold the processor determines that the next state will be the failure state.

10. A management method of an information processing system including a plurality of storage nodes including processors, memories, and storage devices, as well as a network for connecting the storage nodes,
wherein a processor of at least one storage node performs the steps of:
obtaining storage node management information related to a configuration of the storage nodes;
obtaining first failure information related to a first failure occurred in the at least one storage node;
calculating a failure occurrence probability that a second failure occurs based on the storage node management information and a rebuild time of a configuration of the information processing system for the first failure information;
calculating an availability level using the rebuild time and the failure occurrence probability, the availability level is a probability of transition to a state where the information processing system is stopped due to a failure;
notifying a necessity of maintenance work based on the availability level; and controlling an operation of the information processing system based on the availability level by copying information from one storage node of the plurality of storage nodes to a third storage node of the plurality of storage nodes and upon completion of the copying transfers differential data from the one storage node to the third storage node, on a condition that the availability level is higher than a threshold, and searching the plurality of storage nodes for a copy of data stored in the at least one storage node with the first failure and additional data, selecting a storage node that does not contain a copy of the data and the additional data and copies the data and the additional data, on a condition that the availability level is lower than the threshold.

11. The management method of the information processing system according to claim 10, wherein the processor calculates the availability level by calculating the failure occurrence probability that the second failure will occur during the rebuild operation after the first failure occurs.

12. A non-transitory computer-readable medium storing a program for controlling an information processing system including at least one storage node having a processor, a memory, and a storage device, when executed by the processor causes the processor to:

obtain storage node management information related to a configuration of the storage nodes;

obtain first failure information related to a first failure occurred in the at least one storage node;

calculate a failure occurrence probability that a second failure occurs based on the storage node management information and a rebuild time of a configuration of the information processing system for the first failure information;

calculate an availability level using the rebuild time and the failure occurrence probability, the availability level is a probability of transition to a state where the information processing system is stopped due to a failure;

notify a necessity of maintenance work based on the availability level; and control an operation of the information processing system based on the availability level by copying information from one storage node of the plurality of storage nodes to a third storage node of the plurality of storage nodes and upon completion of the copying transfers differential data from the one storage node to the third storage node, on a condition that the availability level is higher than a threshold, and searching the plurality of storage nodes for a copy of data stored in the at least one storage node with the first failure and additional data, selecting a storage node that does not contain a copy of the data and the additional data and copies the data and the additional data, on a condition that the availability level is lower than the threshold.

* * * * *